July 23, 1929.  J. H. DAVIS  1,721,773
AIRPLANE
Filed Dec. 5, 1927   2 Sheets-Sheet 1
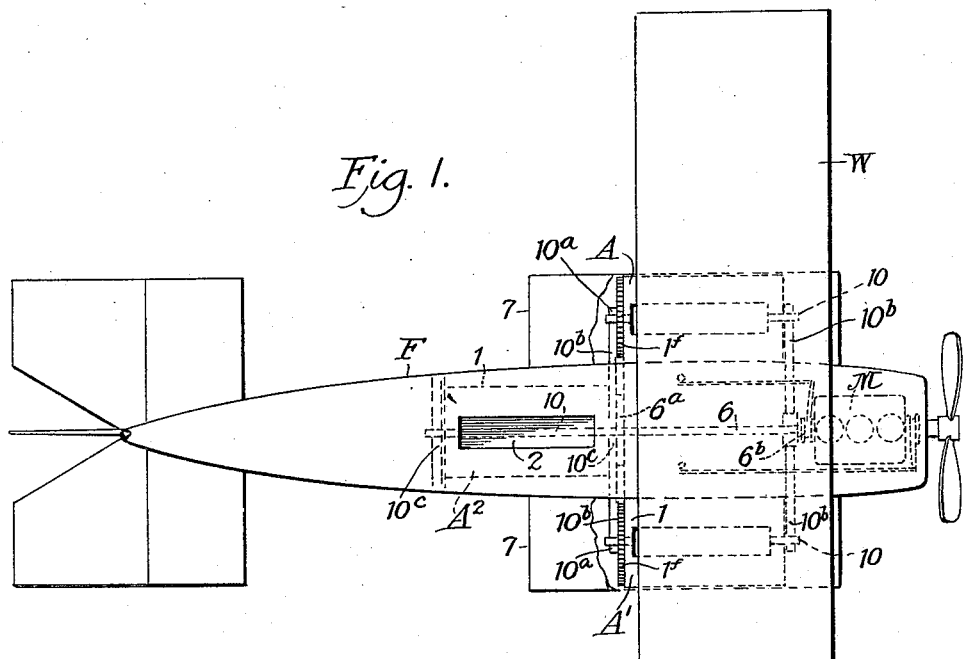
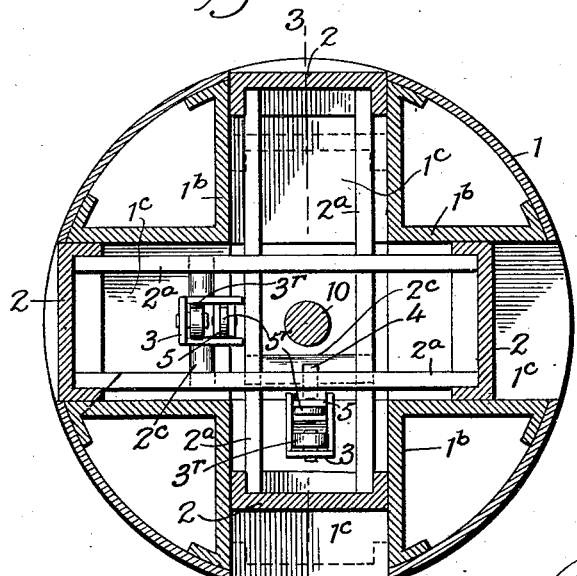
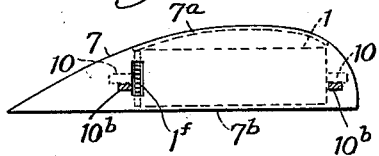

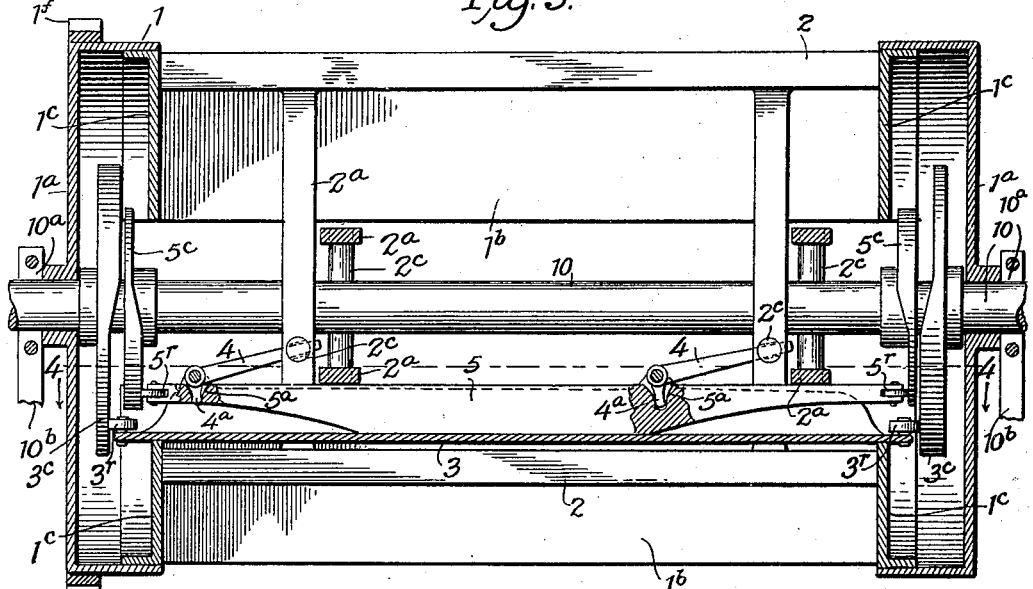
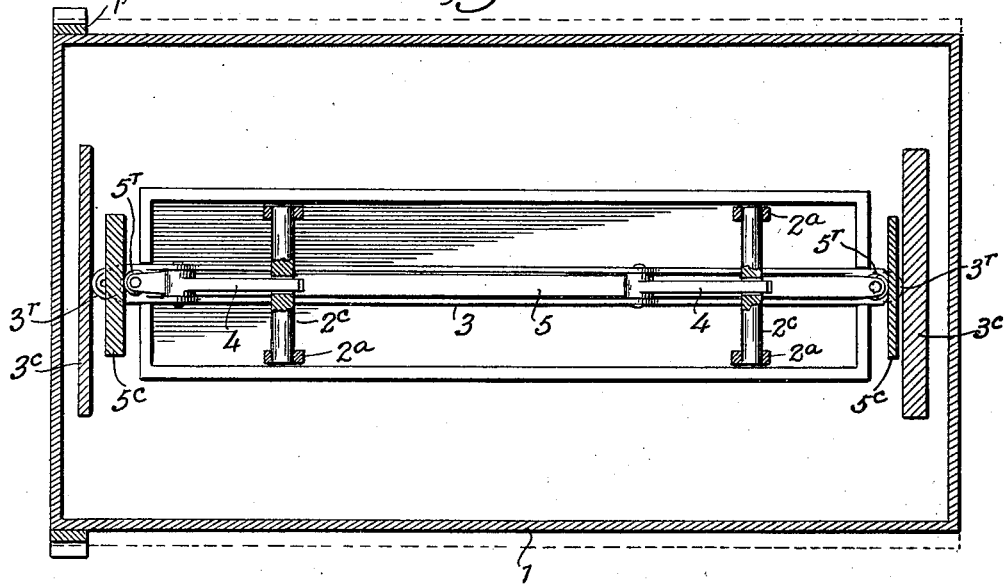

Patented July 23, 1929.

1,721,773

UNITED STATES PATENT OFFICE.

JOHN H. DAVIS, OF PHILADELPHIA, PENNSYLVANIA, ASSIGNOR, BY MESNE ASSIGNMENTS, OF AIR LINE TRANSPORTATION COMPANY, OF PHILADELPHIA, PENNSYLVANIA, A CORPORATION OF DELAWARE.

AIRPLANE.

Application filed December 5, 1927. Serial No. 237,862.

This invention relates to aeronautics, and is especially designed for use in an airplane. The principal object of the invention is to enable an airplane to lift itself vertically particularly in starting, and to arrest dropping in landing, and to enable it to "hover" over a landing place or other objects which is a very desirable feature for bombing planes and the like.

Another object of the invention is to enable the airplane when starting to lift itself so as to free it from the earth and readily clear obstructions which otherwise it would not be able to clear because of the load it carries, or lack of space to take off or move forward in starting.

Another object is to enable an airplane to hover over an object or location if desired, and to arrest its descent as it nears the ground, thereby preventing damage to the plane, which would occur if dropping too rapidly when landing.

A further object is to enable the operator to use such lifting means to prevent side slip of the plane, and to keep the plane on an even keel, in event a wing should break or should be subjected to unequal pressure tending to turn the airplane over.

A further object of the invention is to provide an airplane with a plurality of air displacing attachments which can be operated from the motor independently of the propeller, or in connection with the propeller, as desired, and in the present preferred form of the invention these displacers can force air downwardly to cause the plane to rise vertically; and can also be used to create a suction which will tend to pull the plane upwardly.

In the present preferred form of the invention one or more of these air displacers may be arranged at each side of the fuselage, and one or more thereof may be arranged within the fuselage.

I will explain the invention with reference to the accompanying drawings which diagrammatically illustrate one embodiment of the invention as applied to an airplane, to enable others skilled in the art to adopt and use the invention. The essentials of the invention and the novel combinations of parts and novel features of construction for which protection is desired, are summarized in the claims.

In said drawings:

Figure 1 is a diagrammatic top plan view of an airplane equipped with my novel air displacers;

Fig. 2 is an enlarged transverse section through one of the air displacing cylinders detached;

Fig. 3 is a longitudinal section on the line 3—3, Fig. 2;

Fig. 4 is a section on the line 4—4, Fig. 3;

Fig. 5 is a detail side elevation of one of the air displacers such as would be attached to the side of the fuselage.

An airplane, having a fuselage F and wings W, is diagrammatically illustrated in Fig. 1 as the particular construction of the airplane itself is not a part of the present invention. Attached to the opposite sides of the fuselage, in any suitable manner, are two air displacers A, A' and a similar air displacer $A^2$ is arranged within the fuselage, preferably in the rear of the wing; the latter enabling the fore and aft stability of the plane to be maintained when rising vertically.

These novel air displacers are constructed substantially alike and in the specific embodiment of the invention shown in the drawings each is constructed as hereinafter explained; but it is understood that the drawings are merely diagrammatic and that the invention is capable of embodiment in a variety of mechanical forms, and is not limited or restricted to the particular embodiment thereof herein illustrated.

In the construction shown each air displacer has an outer cylindric casing 1 provided with heads $1^a$ by which it is rotatably mounted upon a stationary shaft 10. The shafts 10 of the side air displacers may be mounted in supports $10^a$ on transverse bars $10^b$ which may extend through the fuselage F as shown in Fig. 1 and the central shaft 10 may be mounted in supports $10^c$ in the fuselage frame.

Within each casing 1 are four longitudinally disposed angle irons $1^b$ which are placed 90° apart and so disposed that the spaces between the opposed parallel faces of the adjacent angle irons $1^b$ form guides for air displacing pistons 2 which are movable radially of the casing. The diametrically opposite pistons 2 are connected by bars $2^a$ so they move as one; and when one piston is in its innermost position the related attached piston is in its outermost position and the opposite pistons move simultaneously.

The casing is provided with longitudinal openings in its periphery opposite the spaces between the angle bars, the openings corresponding in size with the faces of the pistons. The pistons are of considerable length compared to their breadth and may be made of sheet metal stamped to the proper size to fit between the angle irons 1$^b$ and between the angle irons 1$^b$ at the ends of the pistons are transverse plates 1$^c$, the enclosed space between the opposed irons and plates practically form a cylinder within which the piston operates.

The casing 1 has openings in its outer side corresponding with the pistons 2, and the pistons are preferably operated as hereinafter explained so that when the pairs of pistons are rotated into a vertical position as in Fig. 2 the vertically disposed pair of pistons are depressed from the position shown in full lines Fig. 2 to the position indicated in dotted lines Fig. 2. Each time a pair of pistons reach the vertical position shown in full lines in Fig. 2 they are instantaneously depressed to the position shown in dotted lines in Fig. 2. And each pair of pistons is reciprocated, or depressed, twice for each rotation of the casing which is rotated very rapidly by suitable means.

Preferably in the construction shown, the pistons are depressed, when they reach the vertical position shown in Fig. 2, by the following devices. A channel bar 3 is supported within the cylinder parallel with the shaft 10 and is adapted to be moved endwise by means of suitable cams. On this bar 3 are pivotally mounted bell crank levers each having a long arm 4, which is slidably engaged with a pin 2$^c$ rotatably supported in opposite bars 2$^a$ connecting opposite pistons 2. There are two or more of these bell crank levers mounted on the sliding bar 3, as the pistons 2 are elongated so as to have considerable surface area as compared with the circumference or diameter of the shell. Each bell crank lever also has a short arm 4$^a$ which is operatively engaged with a notch 5$^a$ in a sliding bar 5, which may be conveniently assembled within the channel bar 3 as shown. This bar 5 is also adapted to be reciprocated endwise during the rotation of the casing. The bar 5 is shifted endwise simultaneously with, but opposite to the shifting of the related bar 3 and the opposite movements of the two bars 3 and 5 result in amplifying and speeding the oscillating movement of the levers 4, and the consequent amplifying and accelerating movement of the pistons.

In the construction shown the bar 3 is preferably provided with anti-friction rollers 3$^r$ on its ends adapted to contact with fixed cams 3$^c$ attached to the shaft 10 within the casing. The bar 5 is also preferably provided with anti-friction rollers 5$^r$ on its ends adapted to engage cams 5$^c$ fast on the shaft 10. The length of the inclined surfaces of the cams 3$^c$ and 5$^c$ are comparatively short, occupying but about 15°. Each cam 3$^c$ and 5$^c$ has two such inclined portions arranged 180° apart so that the bars 3 and 5 will be oppositely shifted twice during each rotation of the casing and the cams are so disposed that each time a connected pair of pistons approximately reach the vertical position, as indicated in Fig. 2, the bars 3 and 5 will be quickly shifted endwise and cause the levers 4 to depress the vertical pair of pistons with great rapidity from the position shown in full lines in Fig. 2 to the position shown in dotted lines therein.

When thus depressed the lower piston will forcibly depress the air beneath it, thus tending by reaction to lift the casing; while the uppermost piston will tend to create a vacuum above it which will tend to pull the casing upward by suction—the displacer operates both by the forcible downward driving of the air and also by the suction caused by tendency of the upper piston to create a vacuum above the drum.

The drums may be rotated by any suitable means preferably from the main motor shaft. In the construction indicated diagrammatically in Fig. 1 each casing 1 is provided with a gear 1$^f$ which meshes with a gear 6$^a$ on a drum shaft 6 which is adapted to be driven direct from the shaft of motor M. The shaft 6 may be engaged or disengaged from the motor shaft by means of a clutch 6$^b$ of any suitable construction. The shaft 6 may also be directly connected with the shaft 10 of the air depressor within the fuselage as indicated in Fig. 1. If desired the air depressors at opposite sides of the fuselage might be arranged so that they could be operated at different speeds to enable the operator to overcome any tendency of the machine to side slip if the wing should break, or the machine subjected to unequal down drafts of air.

The air displacers at the side of the fuselage are preferably enclosed in shells 7, which are preferably shaped like a section of the wing, as indicated in Fig. 5, so that they will act as short wings to assist in raising the airplane when it is moving directly forward at speed. Each shell 7 should have an opening 7$^b$ in its bottom and an opening 7$^a$ in its top which openings register with the openings in the casing when the pistons reach their vertical positions, as hereinbefore explained.

The drums should be rotated at a speed of approximately 1800 R. P. M. Of course each downward movement of the air displacers exerts a great lifting effect upon the drum the lifting effect being in proportion to the extent of surface area of the pistons and the rapidity of their lowering movement. The parts could be so proportioned that the air displacers would be lowered at the rate of say 352 feet per second. Assuming that the area of each piston or air displacer had a velocity of 352 feet per second it would exert a lifting force or power equal to 300 lbs per square foot upon the drum.

When three air displacers are arranged as indicated in Fig. 1 they can be operated in unison to produce a great lifting effect upon the airplane. In practice I prefer to provide means whereby any one of the air displacers could be put out of operation. The air displacer at either side of the fuselage could be put in or out of operation at will; and the operator could stop or reduce the agitation of the air displacer on one side of the wing while the displacer on the other side of the fuselage is in operation. This would enable him to practically control the lateral stability of the plane and keep it on even keel if the wings should turn or the propeller fail to operate.

As stated the invention is not restricted to the specific construction of the air displacers, nor their operating devices, nor the arrangement thereof illustrated in the drawings. The essentially novel feature of the invention is the provision of air displacers which can be operated substantially in the manner described to exert great vertical lifting effect upon the wing when starting the machine, or to cushion or arrest the vertical dropping of the machine upon the earth in making a landing.

The air displacers could be so arranged to operate the pistons when inclined to the vertical so that they could be used to drive the plane forward or to both lift and propel the plane, but this propulsive effect is not so important in the present case as the lifting effect.

I claim:

1. In combination with an airplane, an air depressor comprising a rotary casing and reciprocating pistons therein and means for intermittently and periodically moving said pistons at high speed on one stroke thereof.

2. In combination with an airplane a plurality of air depressors, each comprising a rotary casing and reciprocating pistons therein and means for intermittently and periodically rapidly moving said depressors at high speed on one stroke thereof.

3. In combination with an airplane, an air depressor comprising a rotary casing, a plurality of pistons therein and means in the casing whereby as the casing is rotated the pistons are moved downward at high speed when in an approximately vertical position.

4. In combination with an airplane a plurality of air depressors, each comprising a rotary casing, a plurality of reciprocating pistons therein and means in the casing whereby as the casing is rotated the pistons are moved downward at high speed when in an approximately vertical position.

5. An attachment for an airplane comprising a rotatable casing, a piston in the casing movable radially thereof and means whereby when the casing is rotated the piston is moved downward at high speed when in an approximately vertical position.

6. An attachment for an airplane comprising a rotatable casing, having diametrically opposite slots in its periphery, a plurality of pistons in the casing operating opposite the slots, and means whereby as the casing is rotated the pistons are intermittently moved at high speed.

7. An attachment for an airplane comprising a rotatable casing having diametrically opposite slots in its periphery, a pair of connected pistons in the casing aligned with the slots, and means for simultaneously reciprocating the pistons to forcibly expel the air at one side of the casing and simultaneously suck air at the opposite side of the casing.

8. An attachment for an airplane comprising a rotatable casing having a plurality of pairs of diametrically opposite slots in its periphery, a plurality of pairs of pistons in the casing aligned with the slots, and means in the casing for reciprocating pairs of pistons to forcibly expel air at one side of the casing, and simultaneously create suction at the opposite side of the casing.

9. In combination with an airplane, an air depressor comprising a rotary casing and reciprocating pistons therein and means for operating the pistons comprising fixed cams within the casing, longitudinally movable bars operated by the cams, and pivoted levers operated by said bars and operatively connected with the pistons.

10. An attachment for an airplane comprising a rotatable casing, a piston in the casing movable radially thereof and means whereby when the casing is rotated the piston is reciprocated, said means comprising fixed cams within the casing, longitudinally movable bars operated by the cams, and pivoted levers operated by said bars and operatively connected with the piston.

11. An attachment for an airplane comprising a rotatable casing having diametrically opposite slots in its periphery, a pair of connected pistons in the casing aligned with the slots, and means for simultaneously reciprocating the pistons to forcibly expel the air at one side of the casing and simultaneously suck air at the opposite side of the casing, said means comprising fixed cams within the casing and longitudinally movable bars operated by the cams and pivoted levers operated by said bars and operatively connected with the pistons.

12. In combination a rotatable casing having opposite openings, a piston in the casing movable between the openings, and means for quickly moving the piston to forcibly expel the air at one opening and simultaneously create suction in the opposite opening when said openings are approximately in vertical alinement.

13. In combination, an open ended cylinder, means for rotating said cylinder on its traverse axis, a piston in the cylinder, and means for moving the piston to forcibly expel air from one open end of such cylinder and simultaneously create suction in the opposite open end thereof.

14. In combination a rotatable casing, an open ended cylinder arranged diametrically of said casing, a piston in the cylinder, and means for quickly moving the piston when the cylinder is substantially vertical to forcibly expel the air from one open end of the cylinder and simultaneously suck air into the opposite open end thereof.

15. For an airplane, a rotatable casing having diametrically opposite openings in its periphery alined with said openings and cylinders respectively connected therewith, pistons in the cylinders, and means for moving the pistons at high speed on one stroke to quickly and forcibly expel air at one side of the casing, and simultaneously create suction at the opposite side of the casing.

16. An attachment for an airplane comprising a plurality of open ended cylinders, means for rotating the cylinders on their transverse axis, a plurality of pistons in the cylinders, and means for moving the pistons at high speed on one stroke to forcibly expel air at one open end of each cylinder, and simultaneously create suction in the opposite open end of such cylinder.

17. An attachment for an airplane comprising a rotatable casing, a plurality of open ended cylinders arranged diametrically of the casing, a piston in each cylinder and means for quickly moving the pistons when in a substantially vertical position to forcibly expel the air from one open end of the cylinder and simultaneously suck in air at the opposite open end thereof.

18. For an airplane, a rotatable casing having a plurality of diametrically opposite openings in its periphery, a plurality of cylinders alined with and connecting with said openings, pistons in the cylinders, and means in the casing for moving the pistons in the cylinders when they are in a substantially vertical position to quickly and forcibly expel air at one side of the casing, and simultaneously create suction at the opposite side of the casing.

19. In combination, an air depressor, means for moving it in an orbit, and means for rapidly moving said depressor at high speed in one and the same direction each time it arrives at a predetermined position in the orbit.

20. In combination, a plurality of air depressors, means for moving them in an orbit and means for rapidly moving each depressor at high speed in one and the same direction each time it arrives at a predetermined position in the orbit.

21. In combination with an airplane, an air depressor, means for moving it in an orbit, and means for rapidly moving said depressor at high speed in one and the same direction each time it arrives at a predetermined position in the orbit.

22. In combination with an airplane, a plurality of air depressors, means for moving them in an orbit, and means for rapidly moving each depressor at high speed in one and the same direction each time it arrives at a predetermined position in the orbit.

23. In combination a casing, a piston movable therein, means for moving the casing in an orbit, and means for moving the piston rapidly in the casing in one and the same direction each time the casing reaches a predetermined position in the orbit.

24. In combination a casing, a piston movable therein, means for rotating the casing on an axis perpendicular to its longitudinal axis, and means for moving the piston rapidly in the casing in one and the same direction when the casing reaches a predetermined position in its rotation.

JOHN H. DAVIS.